United States Patent [19]

Sakuragi

[11] Patent Number: 5,339,409
[45] Date of Patent: Aug. 16, 1994

[54] IMAGE STORAGE/SEARCH APPARATUS FOR MERGING IMAGE AND RELATED KEY CODES WHEN MATCH FOUND BETWEEN KEY CODE AND SPECIFIC CHARACTER CODE OF IMAGE

[75] Inventor: Hiroshi Sakuragi, Yokohama, Japan

[73] Assignee: Kabushiki Kaisha Toshiba, Kawasaki, Japan

[21] Appl. No.: 633,793

[22] Filed: Dec. 26, 1990

[30] Foreign Application Priority Data

Dec. 28, 1989 [JP]  Japan .................................. 1-344401

[51] Int. Cl.$^5$ .............................................. G06F 15/62
[52] U.S. Cl. ..................................... 395/600; 395/425;
364/962; 364/962.2; 364/963; 364/963.4; 364/DIG. 2
[58] Field of Search ................... 364/962, 962.1, 962.3, 364/963, 963.1, 963.4, 963.5; 395/600, 425

[56] References Cited

U.S. PATENT DOCUMENTS

| | | | |
|---|---|---|---|
| 3,930,237 | 12/1975 | Villers | 340/172.5 |
| 4,437,127 | 3/1984 | Hirose | 385/296 |
| 4,555,803 | 11/1985 | Hirose | 382/61 |
| 4,727,589 | 2/1988 | Hirose et al. | 382/56 |
| 4,918,646 | 4/1990 | Hirose | 364/900 |

OTHER PUBLICATIONS

C. J. Date, *An Introduction to Database Systems*, 1986, pp. 147–151.

*Primary Examiner*—Thomas C. Lee
*Assistant Examiner*—Paul Harrity
*Attorney, Agent, or Firm*—Finnegan, Henderson, Farabow, Garrett & Dunner

[57] ABSTRACT

This invention includes an apparatus for storing image data associated with related title data in a storage medium. The invention includes a scanner for reading image data (bit map image data), a combining unit for combining verification data (character data) with the image data read by the scanner, an optical disk for storing the verification data and the image data, a magnetic disk for storing search data, a keyboard or mouse for designating specific data of the search data stored in the magnetic disk, a read unit for reading out the image data and the verification data stored in the optical disk, and control unit for, when the verification data read out by the read unit and the search data designated by the keyboard or mouse match, for storing the search data in the optical disk together with the image data.

10 Claims, 6 Drawing Sheets

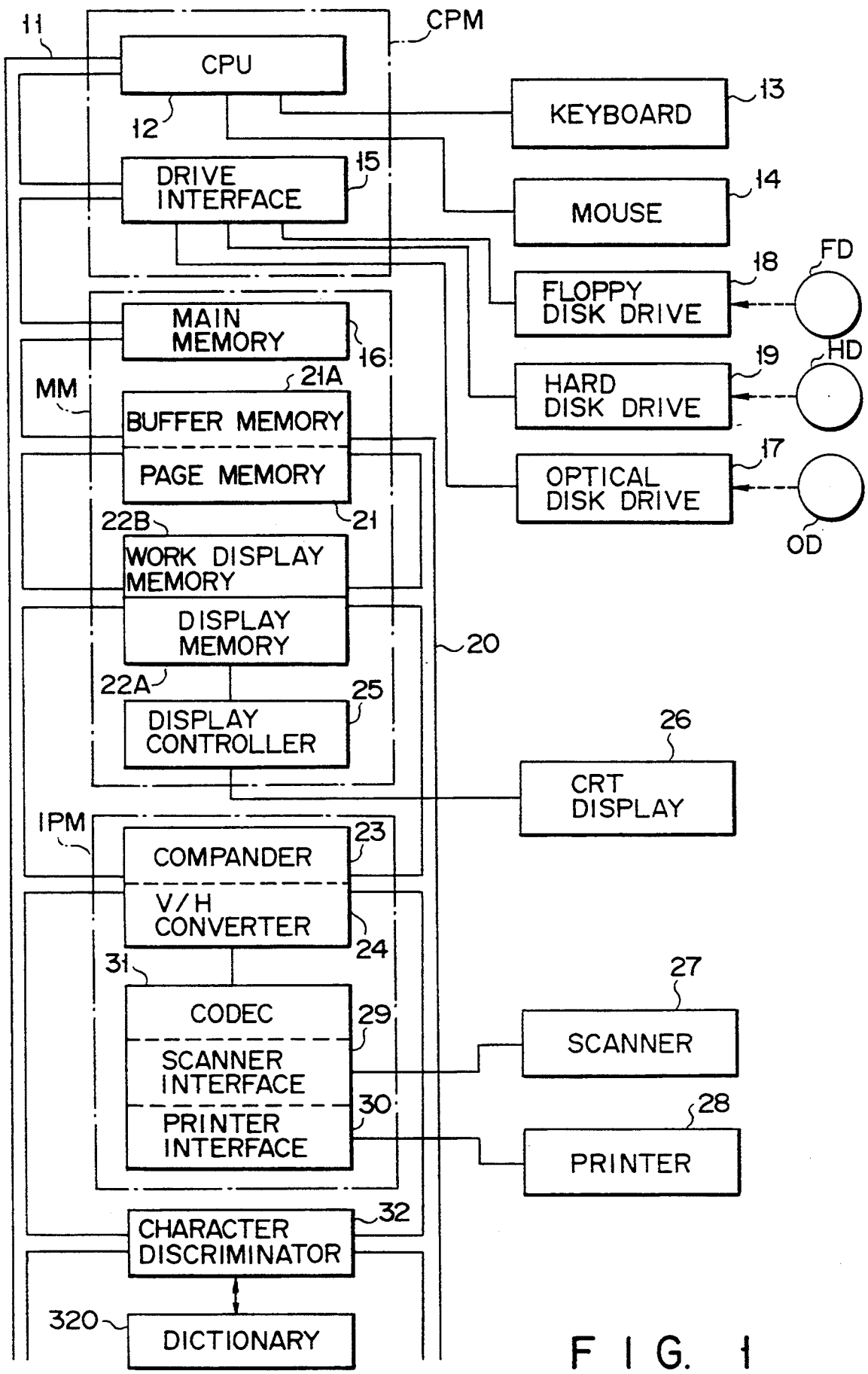
F I G. 1

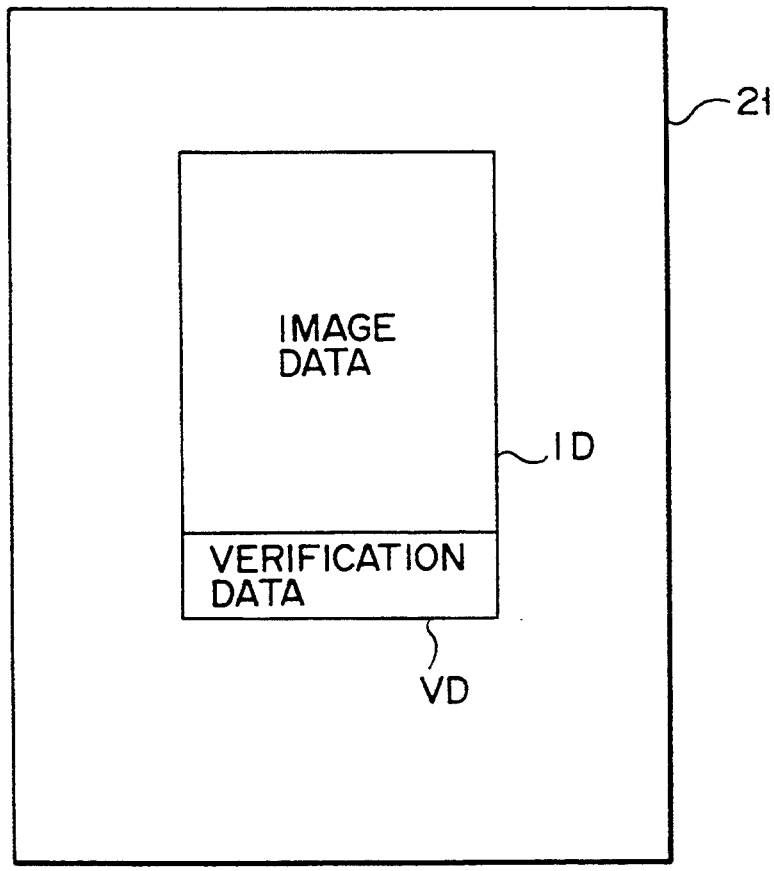
F I G. 2

BINDER NAME : OA TECHNICAL DATA 1984 DOCUMENT S:0
CABINET NAME : OA UNIT1 REMAINING CAPACITY : 100 %

| MULTI-TITLE | | 1 | 2 | | | | | | |
|---|---|---|---|---|---|---|---|---|---|
| NO | KEY NAME | KEY VALUE(CHARACTER)(8 DIGITS)(FIXED) ||||||||
| 1 | DATA NO | 630810MN ||||||||
| 2 | CLASSIFICATION | 6 ||||||||
| 3 | RELEVANT 1 | 1　　　　　FILM SYSTEM ||||||||
| 4 | RELEVANT 2 | 1.1　　　　　　　　550 ||||||||
| 5 | DATA NAME | TOTAL OA SYSTEM ||||||||
| 6 | DATE | 870501 ||||||||
| 7 | | ||||||||
| 8 | | ||||||||
| 9 | | ||||||||
| 10 | | ||||||||
| 11 | | ||||||||
| 12 | | ||||||||
| 13 | | ||||||||
| 14 | | ||||||||
| 15 | | ||||||||
| 16 | | ||||||||
| 17 | | ||||||||
| 18 | | ||||||||
| 19 | | ||||||||
| 20 | | ||||||||

| F1 EXE REGI | F2 X | F3 X | F4 X | F5 X | F6 X | F7 X | F8 X | F9 X | F10 X |
|---|---|---|---|---|---|---|---|---|---|

FIG. 4

RELEVANT TITLE LIST

BINDER NAME : OA TECHNICAL DATA 1984
CABINET NAME : OA UNIT 1
NUMBER OF RELEVANT CASE : 19

| SEARCH NUMBER | DIRECT NUMBER | TOTAL PAGES | |
|---|---|---|---|
| 1 — DATA NO. | | | |
| 2 — CLASSIFICATION | | | |
| 3 — RELEVANT 1 | | | |
| 4 — RELEVANT 2 | | | |
| 5 — DATA NAME | | | |
| 6 — DATE | | | |
| 1 | 2 | 20 | |
| 1 — 630810 MN | | | |
| 2 — SYSTEM | | | |
| 3 — INTEG. FILM SYS. | | | |
| 4 — 550 | | | |
| 5 — TOTAL OA SYS. | | | |
| 6 — 870501 | | | |
| 2 | 8 | 20 | |
| 1 — 630810 MN | | | |
| 2 — ADVERTIZE | | | |
| 3 — INTEG. FILE SYS. | | | |
| 4 — 550 | | | |
| 5 — SYS. CONFIG. | | | |
| 6 — 880110 | | | |
| 19 | 300 | 15 | |

SEARCH NUMBER

26

F I G. 5

RELEVANT TITLE LIST

BINDER NAME : OA TECHNICAL DATA 1984 PAGE ( )
CABINET NAME : OA UNIT 1    DATE YEAR / MONTH / DAY
NUMBER OF RELEVANT CASES : 19   TIME HOUR / MIN.
SORT DESIGNATION : N

| SEARCH NUMBER | DIRECT NUMBER | TOTAL PAGES | |
|---|---|---|---|
| 1 — DATA NO. | | | |
| 2 — CLASSIFICATION | | | |
| 3 — RELEVANT 1 | | | |
| 4 — RELEVANT 2 | | | |
| 5 — DATA NAME | | | |
| 6 — DATE | | | |
| 1 | 2 | 20 | |
| 1 — 630810 MN | | | |
| 2 — SYSTEM | | | |
| 3 — INTEG. FILE SYS. | | | |
| 4 — 550 | | | |
| 5 — TOTAL OA SYS. | | | |
| 6 — 870501 | | | |
| 2 | 8 | 20 | |
| 1 — 630810 MN | | | |
| 2 — ADVERTIZE | | | |
| 3 — INTEG. FILE SYS. | | | |
| 4 — 550 | | | |
| 5 — SYS. CONFIG. | | | |
| 6 — 880110 | | | |
| 19 | 300 | 15 | |
| 1 — 630810MN | | | |
| 2 — | | | |
| 3 — 1 FILM SYSTEM | | | |
| 4 — 1.1 550 | | | |
| 5 — | | | |
| 6 — 870501 | | | |

FIG. 6

IMAGE STORAGE/SEARCH APPARATUS FOR MERGING IMAGE AND RELATED KEY CODES WHEN MATCH FOUND BETWEEN KEY CODE AND SPECIFIC CHARACTER CODE OF IMAGE

BACKGROUND OF THE INVENTION

1. Field of the Invention

The present invention relates to an image data storage/search apparatus capable of storing, e.g., image data in a recording medium such as an optical disk and searching/outputting the stored image data.

2. Description of the Related Art

In an image storage/search apparatus of this type, image data is registered in an optical disk as follows. In general, image data is read by a scanner, and a title as search data for the read image data is input through a keyboard. This title is then recorded in an optical disk together with the image data.

In addition, such an apparatus includes a collective title registration function in order to achieve labor saving in registering operations. In this collective title registration function, titles are collectively stored in a storage medium such as a floppy disk by using an external unit in an off-line mode. Thereafter, the floppy disk is mounted in a magnetic disk drive (floppy disk drive) of the image storage/search apparatus. While the pre-stored titles are read out from the floppy disk, image data corresponding to these titles are read by the scanner and recorded in the optical disk. If such a collective title registration function is used, since a title need not be input every time image data is registered, the efficiency of registration can be increased.

Even if the above-described collective title registration function is used to register image data, an operator is required to perform the following operations: checking a title displayed on a display operation, and verifying this title and image to be registered. Therefore, the operation load of the operator is undesirably increased.

SUMMARY OF THE INVENTION

It is an object of the present invention to provide an image storage/search apparatus which can reduce the load of checking operations to be performed by an operator and can efficiently set search data with respect to image data.

According to the present invention, there is provided an image data storage/search apparatus comprising means for fetching image data; means for combining verification data with the image data fetched by the fetching means; first storage means for storing the verification data and the image data; second storage means for storing search data; means for designating specific data of the search data stored in the second storage means; means for reading out the image data and the verification data stored in the first storage means; and control means, when the verification data read out by the reading means matches the search data designated by the designating means, for storing the search data in the first storage means together with the image data.

According to the present invention, verification data is combined by the combining means with image data fetched by the fetching means, and is stored in the first storage means. Search data stored in the second storage means is then designated by the designating means. If the designated search data matches verification data read out from the first storage means by the reading means, the search data and the image data are stored in the first storage means by the control means. With this operation, even if no verification data is set in image data or no image data cannot be combined with image data, search data stored in the second storage means can be automatically set with respect to image data stored in the first storage means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a block diagram showing an arrangement of an image data storage/search apparatus according to an embodiment of the present invention;

FIG. 2 is a view showing verification data combined with image data;

FIG. 4 is a view showing data read out from a hard disk and displayed on a CRT; and FIGS. 5 and 6 are views respectively showing title lists displayed on the CRT.

DETAILED DESCRIPTION OF THE PREFERRED EMBODIMENT

Figure 3:
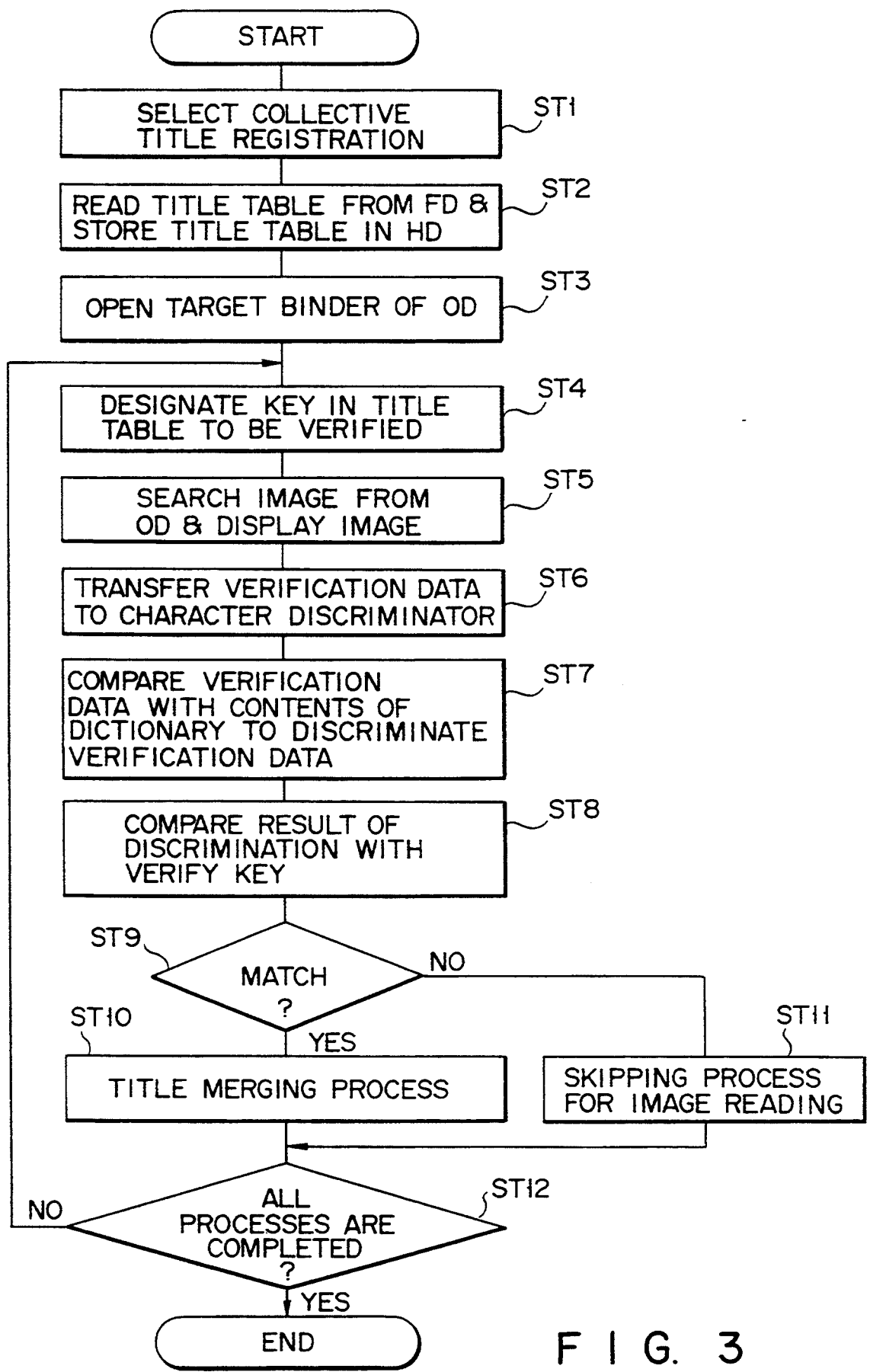
FIG. 3 is a flow chart for explaining an operation of the present invention.

An embodiment of the present invention will be described below with reference to the accompanying drawings.

Referring to FIG. 1, control module CPM is connected to system bus 11. Memory module MM and image processing module IPM are connected to system bus 11 and image bus 20.

In control module CPM, CPU 12 and interface 15 are connected to system bus 11. CPU 12 controls the overall operation of the apparatus and is operated by an operating system which allows multitasking. Keyboard 13 and mouse 14 are connected to CPU 12. Keyboard 13 is used to input various data such as command data. Mouse 14 serves as a pointing device. Mouse 14 is used to move a cursor displayed on the screen of CRT display 26 (to be described later).

Optical disk drive 17 and magnetic disk drives 18 and 19 are connected to interface 15. Optical disk OD is mounted in optical disk drive 17. Image data is stored in optical disk OD. Magnetic disk drive 18 is constituted by, e.g., a floppy disk drive and performs a read/write operation with respect to floppy disk FD. Magnetic disk drive is constituted by a hard disk drive. Hard disk HD which can be replaced with another disk as needed is mounted in magnetic disk drive 19. These magnetic disk drives 18 and 19 store search data for optical disk OD, display data required for a search, image editor programs, and the like.

Memory module MM comprises main memory 16 connected to system bus 11, page memory 21 connected between system bus 11 and image bus 20, buffer memory 21A, display memory 22A, work display memory 22B, and display controller 25 connected to display memory 22A.

Main memory 16 serves to store an operation program and the like of CPU 12. CPU 12 is operated in accordance with this operation program.

Page memory 21 serves to store data read by scanner 27, data enlarged/reduced by compander 23 (these components will be described later), and the like and has a storage capacity corresponding to, e.g., several A4-size pages of image data.

Buffer memory 21A is arranged as part of page memory 21 and stores data read out from optical disk drive 17. Display memory 22A and work display memory 22B serve to store display data. CRT display 26 is connected to display controller 25. The display controller 25 causes CRT display 26 to display data stored in display memory 22A.

Image processing module IPM comprises compander 23 connected to system bus 11 and to image bus 20, vertical/horizontal converter 24, coder/decoder (CODEC) 31 connected to vertical/horizontal converter 24, scanner interface 29 included in coder/decoder 31, and printer interface 30. Scanner (two-dimensional scanning unit) 27 is connected to scanner interface 29. Printer 28 is connected to printer interface 30.

Compander 23 enlarges/reduces image data supplied from page memory 21. Vertical/horizontal converter 24 performs vertical/horizontal conversion of image data supplied from page memory 21. Coder/decoder 31 converts, for example, image data supplied from scanner 27 through scanner interface 29 into a predetermined code or converts a code supplied from page memory 21 into image data. The converted image data is supplied to and displayed on CRT display 26 through display memory 22A and display controller 25 or is supplied to and printed at printer 28 through printer interface 30.

Scanner 27 exposes/scans a document set on a document table (not shown) to generate an electrical signal corresponding to image data of the document. Scanner 27 includes an operating section (not shown) for setting parameters such as the document size of a document to be read, the density of the document, and a reading density, and an automatic document feeder for automatically conveying a document set on the document table.

Printer 28 prints out image data read by scanner 27, image data read out from optical disk drive 17, or the like.

Character discriminator 32 is connected to system bus 11 and image bus 20. Character discriminator 32 discriminates image data of a dot image and outputs character code data corresponding to the image data.

In this embodiment, titles are stored in a floppy disk beforehand in an off-line mode by an external unit such as a personal computer.

Image data is to be read by scanner 27 and stored in a predetermined binder of optical disk OD in advance without setting titles. When a title is to be set for image data stored in optical disk OD, image data corresponding to title must be searched out from optical disk OD. Therefore, image data must include any one of a plurality of key names, which will be described later, as verification data for searching out predetermined image data. However, some image data may include no verification data, or verification data sometimes cannot be combined depending on the type of a document. According to this embodiment, in such a case, verification data is combined with a portion other than image data, as shown in FIG. 2, so as to search out predetermined image data.

More specifically, when image data is to be stored in an optical disk, image data read by scanner 27 is stored in page memory 21 through scanner interface 29, CODEC 31, vertical/horizontal converter 24, and compander 23. When a key name as verification data is input from keyboard 13 while the image data is read in this manner, this verification data is combined with a portion other than the image data.

FIG. 2 shows image data ID stored in page memory 21. Verification data VD input from keyboard 13 is stored in a portion other than image data ID, e.g., a lower portion in FIG. 2. Image data ID stored in page memory 21 is stored in an optical disk together with verification data VD. Verification data VD stored in the optical disk is read out when the corresponding image data is read out. Verification data VD is then stored in page memory 21, as shown in FIG. 2. Although verification data VD is stored and searched together with image data ID, since it is combined with a portion other than image data ID, verification data VD is not displayed or printed out when image data ID is displayed on CRT display 26 or printed out by printer 28.

Note that one optical disk constitutes a data storage, as a large unit, called a cabinet. One or more storage areas, as medium units, called binders are arranged in the cabinet. Each binder consists of a plurality of files. Each file includes one or more storage areas, as small units, called pages. Each page stores data called a document.

An operation of CPU 12 in the above-described arrangement will be described below with reference to a flow chart in FIG. 3, in which titles are assigned to image data stored in an optical disk.

When titles are to be assigned to image data combined with verification data and stored in optical disk OD in advance, collective title registration is selected from a menu displayed on CRT display 26 in a state wherein the floppy disk is mounted in magnetic disk drive 18 and optical disk OD is mounted in optical disk drive 17 (step ST1). Titles of documents stored in floppy disk FD are then read out by magnetic disk drive 18. The readout title is supplied to magnetic disk drive 19 through interface 15 and is stored in hard disk HD mounted in magnetic disk drive 19 (step ST2).

When binder data is input from keyboard 13, a corresponding given binder in optical disk OD is opened in accordance with the binder data (step ST3).

Subsequently, the title stored in hard disk HD is read out by magnetic disk drive 19 and is displayed on CRT display 26 through interface 15, display memory 22A, and display controller 25.

The structure of the title is the same as that of the title already stored in the optical disk, which will described later. More specifically, the title is formed of five key names, for example, DATA; CLASSIFICATION; RELEVANT 1, RELEVANT 2; DATA NAME; and DATE. Each of the key names has a predetermined format, or a given key value. These key names are also provided with sequential numbers (e.g., 1 to 6). CRT display 26 displays not only the above title, but also the binder name (e.g., OA TECHNICAL DATA 1984) which has been opened; the name (e.g., OA UNIT 1) of the cabinet containing this binder; the number (e.g., O) of the documents stored in this binder; and the available capacity (e.g., 100%) remaining in the binder. In addition, function keys (F1 to F10) are displayed in the display area of CRT display 26 other than the information display area for the title, etc. These function keys contains a specific function key (F1) which can operate in relation to the information displayed in the information display area, and the functional content of the specific function key (F1) is also displayed with abbreviated characters (EXE REG1.).

From the information in the displayed title, the verification data and the key name to be verified are selected (step ST4), by designating the sequential number using key board 13 or mouse 14.

FIG. 4 shows a title for one of documents, read out from hard disk HD, actually displayed on CRT display 26. After completing the subsequent processing (ST1-ST5) for the title, which will be mentioned later, a new title for the next document is displayed. FIG. 4 shows a state wherein a sample number "630810MN" of the sequential number "1" is designated as a key name. In this case, in the display area for the key value, 8-digit-fixed characters are displayed to be assigned to the designated data number.

In this state, when function key F1 indicating the function of, for example, "execute registration", is designated, the SEARCH number, the DIRECT number, the negative number, and the five key names of a title (if this title has already been assigned) are read by optical disk unit 17. The SEARCH number serves as a sequential number assigned to each document stored in the opened binder. The DIRECT number indicates the order of the registration (storage operation) effected in the corresponding cabinet. The five key names are, for example, DATA NO; CLASSIFICATION; RELEVANT 1, RELEVANT 2; DATA NAME; and DATE. The read out key names are transferred to CRT display 26, via interface 15, display memory 22A, and display controller 25, and then displayed at display 26 in the form of a list for each document.

Together with the above list, also displayed are the corresponding binder name (OA TECHNICAL DATA (1984)), the corresponding cabinet name (OA UNIT 1), and the number (19) of documents of relevant sources.

FIG. 5 shows the above-mentioned title list actually displayed on CRT display 26. In this title list, each image data is stored in correspondence with a search number, a direct number, and a total number, and a search number "19" indicates image data registered without a title. Therefore, in image data with the search number "19", the record areas of first to sixth key names are left blank.

If a predetermined search number ("19" in this case) or a direct number ("300" in this case) is designated by keyboard 13 or mouse 14 in this display state, image data ID and verification data VD corresponding to the search number "19" or to the direct number "300" are searched from optical disk OD and is stored in page memory 21 through interface 15, buffer memory 21A, and CODEC 31. Image data ID stored in page memory 21 is displayed on CRT display 26 through display memory 22A and display controller 25 (step ST5).

Subsequently, verification data VD stored in page memory 21 is read out and is supplied to character discriminator 32. More specifically, verification data VD read out from page memory 21 is supplied to character discriminator 32 through, e.g., system bus 11 (step ST6). In character discriminator 32, verification data VD of the supplied dot image is verified by dictionary 320 and discriminated (step ST7). The discrimination result is then output as corresponding character code data (ASCII code) from character discriminator 32 to main memory 16.

The character code data stored in main memory 16 is compared with a key name (DATA NO. "630810MN") of the title which is selected at step ST4 by keyboard 13 or mouse 14 (step ST8). If they match each other (YES in step ST9), data corresponding to the key names (DATA NO "630810MN", CLASSIFICATION "6", RELEVANT "1", RELEVANT "1, 1", DATA NAME "TLTAL OA SYSTEM", DATE "870501") of the titles stored in hard disk HD is read out and is supplied to optical disk drive 17 through interface 15. This data is then stored in optical disk OD in correspondence with a document searched from optical disk OD (step ST10). If the character code and the selected key name do not match (NO in step ST9), the corresponding image is skipped and no title is assigned (step ST11).

Subsequently, it is checked whether all processes for the titles of documents transferred from the floppy disk into hard disk HD are completed (step ST12). If NO in step ST12, the operations in steps ST4 to ST12 are repeated.

If, in this case, the key name to be verified which is described with reference to FIG. 4 is not changed and fixed, a key name and verification data VD are automatically verified, and a title is assigned to the corresponding image data if they match each other.

FIG. 6 shows a title list stored in the optical disk after the processing shown in FIG. 3 is completed. In this title list, a title is assigned to the image data (FIG. 5) registered without a title.

According to the above embodiment, image data without titles are collectively stored in an optical disk together with verification data VD in advance. In addition, titles corresponding to these image data are collectively stored in a floppy disk. If a designated key name of the titles stored in the floppy disk matches verification data VD corresponding to the image data stored in the optical disk, the image data combined with a title is stored in the optical disk.

With this operation, since an operator need not sequentially check titles and image data one by one, the number of steps to be performed by the operator can be decreased.

In addition, even if no document number or no drawing number as verification data is combined with image data, or such verification data cannot be combined, image data to which a title is to be assigned can be discriminated without changing any contents of the image data by suffixing verification data VD to the image data, as shown in FIG. 2.

Furthermore, if a key name is fixed, titles can be automatically assigned to image data which are collectively stored in an optical disk without titles. This further decreases the number of steps to be preformed by the operator.

The present invention is not limited to the abovedescribed embodiment. Various changes and modifications can be made within the spirit and scope of the invention.

As has been described above in detail, according to the image data storage/search apparatus of the present invention, even if image data includes no verification data or no verification data can be combined with image data, search data stored in a second storage means can be efficiently set for image data stored in a first storage means so as to reduce the load of a checking operation of search data and of image data to be performed by an operator.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An image data storage apparatus wherein a plurality of image data each associated with a first number of related key codes are stored and desired image data is searched by specifying at least one of the related key codes of the desired image data, said image data storage apparatus comprising:

a first storage medium capable of storing the plurality of related key codes;

a second storage medium capable of storing the plurality of image data and the plurality of related key codes;

first storing means for storing, in the first storage medium, a plurality of the first number of related key codes respectively corresponding to a plurality of the image data to be stored in the second storage medium;

second storing means for storing, in the second storage medium, a plurality of character codes together with the plurality of image data, each of the character codes being assigned to one image data and corresponding to at least one of the first number of related key codes of the one image data;

first means for reading at least one of the plurality of the first number of related key codes from the first storage medium;

means for designating at least one of the first number of related key codes read out by the first reading means;

second means for reading the character codes associated with the plurality of image data from the second storage medium;

means for finding from the character codes, read out by the reading means, a specific character code corresponding to the key code designated by the designating means;

means for merging the first number of related key codes, corresponding to the specific character code found by the finding means, with the image data corresponding to the specific character code and stored in the second storage medium; and means, coupling to said first reading means, said second reading means, said designating means, said finding means, and said merging means, for sequentially repeating, for a plurality of said image data, the merging of the key codes performed by the merging means so long as the finding means finds the specific character code corresponding to the key code designated by the designating means.

2. An apparatus according to claim 1, wherein said first storing means includes means for holding a list containing a plurality of the key codes.

3. An apparatus according to claim 2, wherein said designating means includes means for specifying the key code to be verified in the list.

4. An apparatus according to claim 3, further comprising means for searching for the image data associated with the specified key code from said second storage medium and displaying the searched image data.

5. An apparatus according to claim 4, wherein said merging means includes means for combining the first number of related key codes and the image data so that the image data and the first number of related key codes are stored in separate areas of a page memory when the character code associated with the image data matches the specified key code.

6. An apparatus according to claim 4, wherein said finding means includes means for discriminating contents of the character code corresponding to the searched image data and means for comparing the discriminated character code with the specified key code.

7. An information storage and search apparatus for storing a plurality of image data each associated with a plurality of key codes, the plurality of key codes being used for searching a desired image data, said apparatus comprising:

means for holding the plurality of the key codes associated with one of the plurality of images;

means for storing the plurality of image data and a plurality of character codes, each of the plurality of character codes being assigned to one of the plurality of image data, each of the plurality of character codes having a data size smaller than a data size of the plurality of key codes of the associated image data;

means for designating one of the plurality of key codes held by the holding means;

means for reading out the plurality of character codes associated with the plurality of image data from the storing means;

merging means for reviewing the plurality of character codes read out by the reading means using the key code designated by the designating means and, when a specific character code corresponding to the designated key code is found, merging the plurality of key codes held in the holding means with the image data of the specific character code stored in the storing means; and means, coupling to said holding means, said reading means, said designating means, and said merging means, for sequentially repeating, for a plurality of said image data, the merging of the key codes performed by the merging means.

8. An information storage and search apparatus for storing a plurality of image data each associated with a plurality of key codes and for searching a desired image data by designating the key codes, said apparatus comprising:

means for scanning an original document so as to obtain image data to be stored;

first storage means for storing the plurality of key codes related to the image data obtained by the scanning means;

means for adding a character code to each of the image data scanned by the scanning means, the character code being used by verifying the plurality of key codes and having a data size smaller than a data size of the plurality of key codes associated with the image data;

second storage means for storing the plurality of image data to which the character codes are added and the associated character codes;

means for designating one of the plurality of key codes stored in the first storage means;

means for reading out the character codes associated with the plurality of image data from the second storage means;

merging means for verifying said one of the plurality of key codes designated by the designating means by the character codes read out by the reading means and, when the designated key code corresponds to one of the read out character codes, merging the plurality of key codes stored in the first storing means with the image data associated with said one of the read out character codes stored in the second storage means; and means, coupling to said first storage means, said reading means, said designating means, and said merging means, for sequentially repeating for a plurality of said image data the merging of the key codes performed by the merging means.

9. An image data storage apparatus wherein a plurality of image data, each associated with related key codes, are stored and desired image data is searched by specifying at least one of the related key codes of the desired image data, said image data storage apparatus comprising:

first storing means for storing, in a first storage medium, a plurality of related key codes respectively corresponding to a plurality of said image data;

second storing means for storing, in a second storage medium, a plurality of said image data together with a plurality of character image data, each of said character image data being assigned to one image data;

first means for reading the related key codes from said storage medium;

means for designating one of the related key codes read out by the first reading means;

second means for reading the character image data from the second storage medium;

means for converting the read character image data into character code data by discriminating the character image data read by the second reading means;

means for merging the related key codes corresponding to the designated key code with the image data corresponding to the character image data read by said second reading means and stored in the second storage medium when the converted character code data corresponds to the designated key code; and means, coupled to the first reading means, second reading means, designating means, and merging means, for sequentially repeating, for each of the plurality of said image data, the merging of the key codes performed by the merging means when the character code data converted by the converting means corresponds to the key code designated by the designating means.

10. An image data storage apparatus wherein a plurality of image data, each associated with related key codes, are stored and desired image data is searched by specifying at least one of the related key codes of the desired image data, said image data storage apparatus comprising:

a first storage medium capable of storing the plurality of related key codes;

a second storage medium capable of storing the plurality of image data and the plurality of related key codes;

first storing means for storing, in the first storage medium, a plurality of the related key codes respectively corresponding to a plurality of the image data to be stored in the second storage medium;

second storing means for storing, in the second storage medium, a plurality of said image data together with a plurality of character image data, each of the character image data being assigned to one image data and corresponding to at least one of the related key codes and having a data size smaller than a data size of the key codes of the one image data;

first reading means for reading at least one of the plurality of the related key codes from the first storage medium;

means for designating one of the related key codes read out by the first reading means;

second reading means for reading the character image data associated with the plurality of image data from the second storage medium;

means for finding, from the character image data read from the second storage medium, a specific character code corresponding to the key code designated by the designating means;

means for discriminating the character image data, read from the second storage medium, so as to output character code data corresponding to the character image data;

means for merging the related key codes, corresponding to said specific character code found by the finding means, with the image data corresponding to said specific character code; and means, coupled to said first reading means, second reading means, said designating means, said finding means, and said merging means, for sequentially repeating, for a plurality of said image data, the merging of the key codes performed by the merging means so long as the finding means finds the specific character code corresponding to the key code designated by the designating means.

* * * * *